(12) United States Patent
Flatt et al.

(10) Patent No.: US 6,286,551 B1
(45) Date of Patent: Sep. 11, 2001

(54) SEGMENTED STACKABLE HEAD DESIGN

(75) Inventors: Larry W. Flatt; Robert W. Quarles, both of Hendersonville, TN (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/770,182

(22) Filed: Jan. 29, 2001

Related U.S. Application Data

(62) Division of application No. 09/576,556, filed on May 24, 2000.

(51) Int. Cl.⁷ ..................................................... F16K 11/10
(52) U.S. Cl. ........................ 137/884; 222/146.5; 222/330
(58) Field of Search ........................ 137/884; 222/146.5, 222/330

(56) References Cited

U.S. PATENT DOCUMENTS

| | | |
|---|---|---|
| 3,115,282 | 12/1963 | McKenzie . |
| 3,457,943 | 7/1969 | Kawabata . |
| 4,082,324 | 4/1978 | Obrecht . |
| 4,874,014 | 10/1989 | Grant et al. . |
| 5,806,720 | 9/1998 | Zook . |

*Primary Examiner*—John Fox
(74) *Attorney, Agent, or Firm*—Schwartz & Weinrieb

(57) ABSTRACT

A fluid dispensing head assembly which comprises a fluid dispensing head assembly segment or modular unit which is adapted to be secured together with additional segments or modular units whereby resulting fluid dispensing head assemblies of predetermined sizes are able to be achieved in order to meet or satisfy customer dispensing or deposition application requirements. Each fluid dispensing head assembly segment or modular unit is fabricated so as to accommodate, house, or mount a predetermined number of dispensing valve components, such as, for example, six, eight, or ten dispensing valves. Accordingly, should a particular customer require a fluid dispensing head assembly which requires, for example, the incorporation therein of twelve, fourteen, sixteen, eighteen, twenty, or even a higher number of fluid dispensing valves to be incorporated therein, a plurality of the fluid dispensing head assembly segments or modular units can be secured together such that the resulting assemblage contains the desired or required number of fluid dispensing valves.

15 Claims, 1 Drawing Sheet

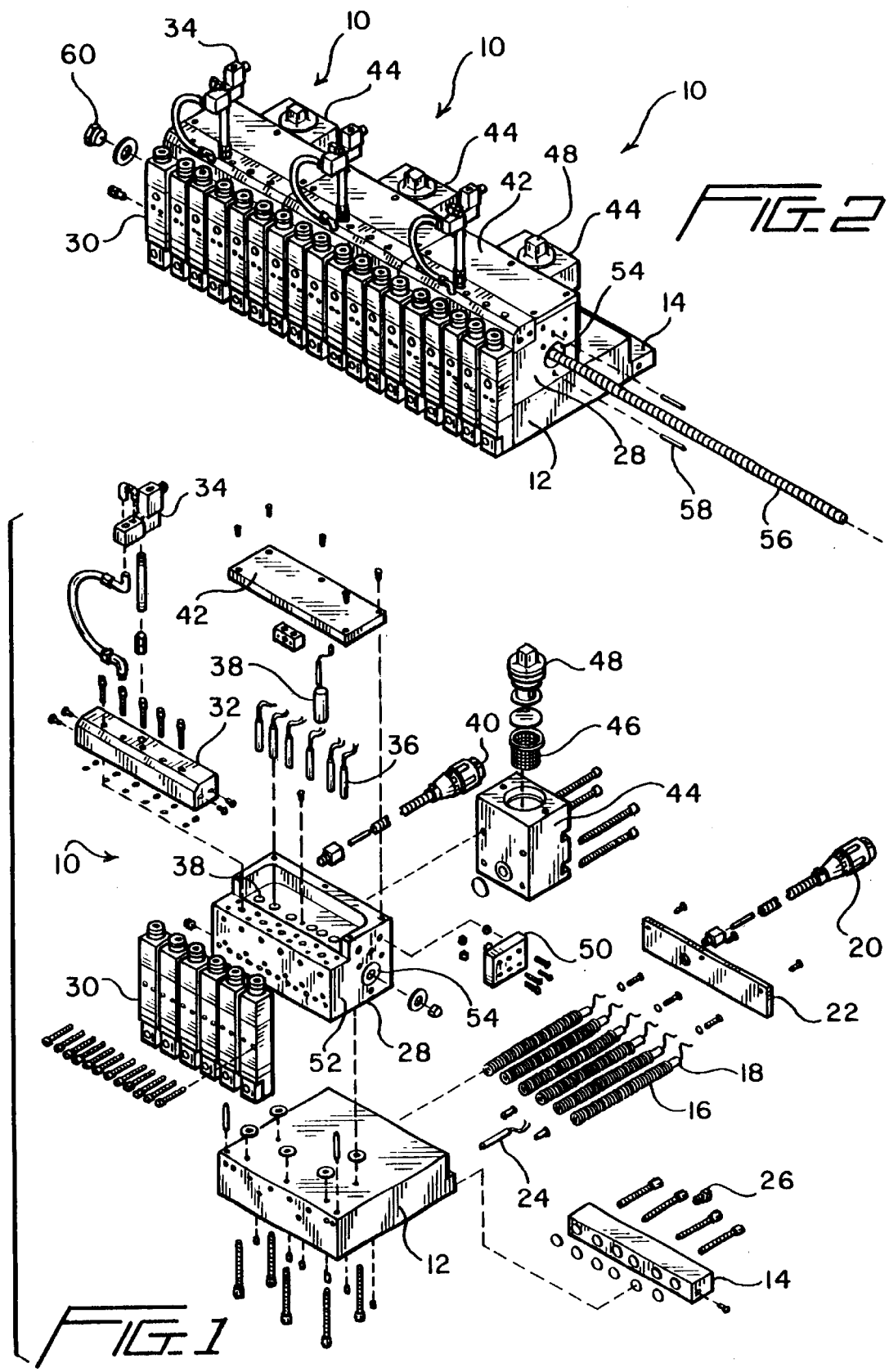

6,286,551 B1

SEGMENTED STACKABLE HEAD DESIGN

This patent application is a Divisional application of Ser. No. 09/576,556, filed May 24, 2000.

FIELD OF THE INVENTION

The present invention relates generally to fluid dispensing head assemblies, and more particularly to a new and improved fluid dispensing head segment or modular unit assembly which enables a plurality of fluid dispensing head segment or modular unit assemblies to be secured together so as to in effect customize the fabrication of a composite fluid dispensing head assembly such that the resulting assembly is optimally sized so as to be especially adapted for particularly desired or required customer applications.

BACKGROUND OF THE INVENTION

Fluid dispensing head assemblies, such as, for example, hot melt adhesive fluid dispensing head assemblies, are known to conventionally comprise an air heater block, a service block which is mounted atop the air heater block, a plurality of fluid dispensing valves which are mounted upon a front face of the service block, a filter block mounted upon a rear face of the service block, an air manifold which is mounted atop the service block for operative cooperation with the plurality of dispensing valves, and an air distribution block which is mounted upon a rear surface of the air heater block. It is also conventional to fabricate the air heater block, the service block, the air manifold, and the air distribution block components such that the same have respective width dimensions which can mount or accommodate, for example, six (6) dispensing valves.

While such fluid dispensing head assemblies are of course suitable or adequate for performing numerous fluid dispensing or deposition operations in accordance with specific fluid deposition applications or requirements, other fluid deposition applications may require the use of other fluid dispensing head assemblies which must accommodate or mount a number of dispensing valves which is different from the conventional fluid dispensing head assemblies housing or accommodating six fluid dispensing valves. Consequently, such other fluid dispensing head assemblies must have dimensions which are different from those of the aforenoted conventional fluid dispensing head assemblies which comprise six dispensing valves. Accordingly, such other fluid dispensing head assemblies must in effect be customized or fabricated in a custom-made manner so as to in fact comprise a greater number of dispensing valves whereby such customized or custom-made fluid dispensing head assemblies would then be suitable for accomplishing the desired dispensing or deposition operations. The customized or custom-made fabrication of such other fluid dispensing head assemblies, however, is quite time-consuming, whereby production of such other fluid dispensing head assemblies requires a considerable amount of time to achieve with the result that customer orders unfortunately require a considerable amount of time to fill.

A need therefore exists in the art for a new and improved fluid dispensing head assembly, and more particularly for a new and improved fluid dispensing head segment or modular unit assembly which enables a plurality of fluid dispensing head segment or modular unit assemblies to be readily secured together in predetermined multiples. In this manner, fluid dispensing head assemblies of predetermined sizes can in effect be rapidly fabricated or manufactured in order to readily meet customer's requirements for such predeterminedly sized fluid dispensing head assemblies without the need for customizing or custom-making such assemblies as original single integral assemblies having the desired or required sized dimensions.

OBJECTS OF THE INVENTION

Accordingly, it is an object of the present invention to provide a new and improved fluid dispensing head assembly.

Another object of the present invention is to provide a new and improved fluid dispensing head assembly which comprises a fluid dispensing head assembly segment or modular unit.

An additional object of the present invention is to provide a new and improved fluid dispensing head assembly which comprises a fluid dispensing head assembly segment or modular unit which enables a plurality of such fluid dispensing head assembly segments or modular units to be secured together.

A further object of the present invention is to provide a new and improved fluid dispensing head assembly which comprises a fluid dispensing head assembly segment or modular unit which enables a plurality of such fluid dispensing head assembly segments or modular units to be secured together so as to readily meet customer fluid deposition or dispensing application or operation requirements.

SUMMARY OF THE INVENTION

The foregoing and other objectives are achieved in accordance with the teachings and principles of the present invention through the provision of a new and improved fluid dispensing head assembly which comprises a fluid dispensing head assembly segment or modular unit which is adapted so as to be able to be secured together with additional segments or modular units whereby resulting fluid dispensing head assemblies or predetermined sizes are able to be achieved in order to meet or satisfy customer dispensing or deposition application requirements. More particularly, each fluid dispensing head assembly segment or modular unit is fabricated so as to accommodate, house, or mount a predetermined number of dispensing valve components, such as, for example, six (6) dispensing valves, eight (8) dispensing valves, or ten (10) dispensing valves.

Accordingly, should a particular customer require a fluid dispensing head assembly which requires, for example, the incorporation therein of twelve (12), fourteen (14), sixteen (16), eighteen (18), twenty (20), or even a higher number of fluid dispensing valves to be incorporated therein, a plurality of the fluid dispensing head assembly segments or modular units can be secured together such that the resulting assemblage contains the desired or required number of fluid dispensing valves. For example, if a particular fluid dispensing head assemblage requires twelve (12) fluid dispensing valves in order to achieve a particular fluid dispensing or deposition operation or application, two fluid dispensing head assembly segments or modular units, each one of which comprises six (6) fluid dispensing valves, can be secured together. Similarly, if a particular fluid dispensing head assemblage requires, for example, eighteen (18) fluid dispensing valves in order to achieve another particular fluid dispensing or deposition operation or application, then three fluid dispensing head assembly segments or modular units, each one of which comprises six (6) fluid dispensing valves, can be secured together. In other words, by mixing and matching, in effect, any one of a plurality of the fluid dispensing head assembly segments or modular units, a resulting fluid dispensing head assemblage, having a predeterminedly desired or required number of fluid dispensing valves incorporated therein, can be achieved in order to readily and rapidly meet customer orders, needs, and requirements.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is an exploded view of a new and improved fluid dispensing head assembly segment or modular unit which has been constructed in accordance with the principles and teachings of the present invention; and FIG. 2 is a perspective view showing a new and improved fluid dispensing head assembly assemblage which has been constructed in accordance with the teachings and principles of the present invention and which comprises a plurality of the new and improved fluid dispensing head assembly segments or modular units as shown in FIG. 1, whereby the resulting fluid dispensing head assembly assemblage incorporates therein a predetermined number of fluid dispensing valves so as to readily and rapidly meet customer application or deposition needs or requirements.

DETAILED DESCRIPTION OF THE PREFERRED EMBODIMENT

Referring now to the drawings, and more particularly to FIG. 1 thereof which is an exploded view of a new and improved fluid dispensing head assembly segment or modular unit which has been constructed in accordance with the principles and teachings of the present invention, and which is generally indicated by the reference character 10, it is initially noted that the primary or major components of the new and improved fluid dispensing head assembly segment or modular unit 10 which has been constructed in accordance with the principles and teachings of the present invention are substantially the same as, or virtually identical to, corresponding components of conventionally known fluid dispensing head assemblies, and consequently, such components will only be identified and briefly discussed but will not be discussed or described in detail in view of the fact that such components are well known and are not relevant to the specific characteristics or features of the present invention. Subsequently, the new features characteristic of the present invention comprising, for example, modifications to the existing or conventionally known components, will of course be disclosed and discussed in detail.

More particularly, as shown, the new and improved fluid dispensing head assembly segment or modular unit 10 is, for example, particularly adapted for use in connection with the dispensing or deposition of hot melt adhesive, however, it is to be understood that the fluid dispensing head assedmbly segment or modular unit 10 can be used, or can be adapted or modified, for the dispensing of fluids other than hot melt adhesives, such as, for example, cosmetic lotions, plastic materials, or the like. Accordingly, while such apparatus may be used to dispense or deposit any one of a plurality of different fluid materials, the following description will be oriented toward the dispensing or deposition of hot melt adhesive materials. As therefore seen in FIG. 1, it is seen that the new and improved fluid dispensing head assembly segment or modular unit 10 comprises an air heater block 12 which has an air distribution block 14 operatively associated therewith, and within which a plurality of hollow air heater coils 16 are adapted to be disposed for heating incoming air for operative association with the hot melt adhesive which is to be dispensed or deposited, for example, upon a suitable substrate. The heater coils 16 have electrical cartridge heaters 18 respectively inserted therein, and an electrical connector 20 provides electrical power to the cartridge heaters 18. An air heater block cover plate 22 is adapted to be secured to the rear face of the air heater block 12 so as to close or cover such rear open face thereof. Lastly, a temperature sensor 24 is provided for controlling the energization of the cartridge heaters 18 so as to in turn control the temperature of the incoming air. Incoming air is supplied to the air distribution block 14 by means of an air hose connector 26 which is fluidically connected to a suitable air regulator, not shown.

A service block 28 is adapted to be mounted atop the air heater block 12, and the service block 28 has operatively associated therewith, and mounted upon the front face thereof, a plurality of adhesive dispensing valves 30. As illustrated and in accordance with the new and improved fluid dispensing head assembly segment or modular unit 10 constructed in line with the principles and teachings of the present invention, it is seen that the width dimension of the service block 28 is such as to accommodate, house, or mount six (6) adhesive dispensing valves 30 upon the front face thereof. The fabrication of the service block 28 wherein the service block 28 has the predetermined width dimension so as to be able to accommodate, house, or mount six (6) adhesive dispensing valves 30 upon the front face thereof is noted to be exemplary only in that the service block 28 can be provided with any other desirable predetermined width dimension such that, in turn, any desirable number of dispensing valves 30 can be mounted upon the front face thereof, such as, for example, eight (8), ten (10), or the like dispensing valves 30.

The service block 28 has further mounted upon a front region thereof an air manifold 32 which is adapted to effectively fluidically route, convey, or conduct inlet control air to the adhesive dispensing valves 30 so as to actuate the same. The admission of the inlet control air into the air manifold 32 is controlled by means of a suitable solenoid mechanism 34. A plurality of adhesive material heaters 36 are adapted to be mounted or inserted into respective bores formed within the upper region of the service block 28, and a temperature sensor mechanism 38 is provided in conjunction with the adhesive material heaters 36 so as to suitably energize the same in accordance with predetermined sensed temperature levels. An electrical connector 40 is also adapted to be operatively mounted upon the service block 28 so as to provide electrical power to the adhesive material heaters 36 as well as to the temperature sensor mechanism 38. A head or service block cover plate 42 is also mounted upon the upper surface of the service block 28 so as to close and seal the upper region of the service block 28.

It is to be noted, as may best be seen and appreciated from FIG. 2, that the air manifold 32 and the head or service block cover plate 42 both have predetermined width dimensions which match that of the service block 28, and that the service block 28 has a predetermined width dimension which matches that of the air heater block 12. In this manner, when the air manifold 32 and head or service block cover plate 42 are mounted upon the service block 28, and in turn, when the service block 28 is mounted upon the air heater block 12, all components have substantially the same width dimension whereby the overall width dimension of the particular fluid dispensing head assembly segment or modular unit 10 is predetermined in accordance with the desired number of adhesive dispensing valves 30 which are to be mounted upon or incorporated within the fluid dispensing head assembly segment or modular unit 10.

It is lastly noted that a filter block 44 is mounted upon a rear or back surface portion of the service block 28, and the filter block 44 is provided with a basket-type filter component 46 as well as a threaded plug or nut 48 which is threadedly engaged within the filter block 44 so as to retain the filter component 46 therewithin. The filter component 46 serves to filter any debris or particles which may be contained within the incoming adhesive material which is conducted into the filter block 44 through means of a suitable port, not shown, provided within a rear surface portion of the filter block 44. In order to mount the endmost one of the fluid dispensing head assembly segments or modular units 10 upon the adhesive dispensing or deposition machine, not shown, a mounting plate or bracket 50 is also adapted to be fixedly secured to a side wall 52 of the service block 28. The mounting plate or bracket 50 also serves to thermally isolate the endmost one of the fluid dispensing head assembly segments or modular units 10 from the adhesive dispensing or deposition machine, not shown.

Having now described the basic components of a fluid dispensing head assembly, or more particularly, having now described the basic components of one of the fluid dispensing head assembly segments or modular units 10 as utilized within, and in accordance with the principles and teachings of, the present invention, the unique features or characteristics of the present invention will now be described. More particularly, it is desirable in accordance with the principles and teachings of the present invention to serially dispose a plurality of the fluid dispensing head assembly segments or modular units 10 in a side-by-side secured array so as to in effect readily and easily fabricate an extended array of fluid dispensing head assembly segments or modular units 10 which comprises an increased number of adhesive material dispensing valves 30 so as to satisfy particular dispensing or deposition requirements attendant a particular dispensing or deposition operation or application. As can therefore be appreciated as a result of additional reference being made to FIG. 2, three fluid dispensing head assembly segments or modular units 10 are disposed in a side-by-side array and are adapted to be secured together. It is noted, as has been discussed hereinbefore, that while each one of the fluid dispensing head assembly segments or modular units 10 is illustrated as comprising, for example, six hot melt material dispensing valves 30, in accordance with the principles and teachings of the present invention, each one of the fluid dispensing head assembly segments or modular units 10 can alternatively comprise, for example, eight, ten, or the like, hot melt material dispensing valves 30.

The important or unique feature or characteristic of the present invention is that by means of serially disposing the fluid dispensing head assembly segments or modular units 10 in the noted side-by-side array, a multiple number of basic sets of hot melt material dispensing valves 30 can be provided within each resulting assemblage of fluid dispensing head assembly segments or modular units 10. Different sets of hot melt material dispensing valves 30 can also be mixed and matched in order to meet or satisfy particular dispensing or deposition requirements. For example, FIG. 2 discloses three fluid dispensing head assembly segments or modular units 10 which therefore comprise three sets of hot melt material dispensing valves 30 wherein each set of hot melt material dispensing valves 30 comprises six dispensing valves 30. Accordingly, the assemblage of fluid dispensing head assembly segments or modular units 10 shown in FIG. 2 comprises eighteen dispensing valves 30. Alternatively, however, the assemblage of fluid dispensing head assembly segments or modular units can comprise two fluid dispensing head assembly segments or modular units 10 wherein the total number of dispensing valves 30 disposed within the assemblage of fluid dispensing head assembly segments or modular units 10 comprises twelve dispensing valves 30. Still further, if a particular fluid dispensing head assembly segment or modular unit 10 comprises eight dispensing valves 30, then when such segment or modular unit 10 is combined or adjoined to a segment or modular unit 10 comprising six dispensing valves 30, then the total number of dispensing valves comprising the assemblage of fluid dispensing head assembly segments or modular units 10 comprises fourteen dispensing valves 30. Obviously, then, by fabricating the basic fluid dispensing head assembly segments or modular units 10 so as to comprise, for example, either six, eight, or ten dispensing valves 30, a plurality of fluid dispensing head assembly segments or modular units 10 can be secured together so as to in effect achieve an assemblage of fluid dispensing head assembly segments or modular units 10 wherein a particular number of dispensing valves 30 can be incorporated within the assemblage.

Accordingly, in order to achieve the side-by-side secured array or arrangement of the plurality of fluid dispensing head assembly segments or modular units 10, each one of the service blocks 28 of each fluid dispensing head assembly segment or modular unit 10 is provided with an axially extending throughbore 54. A threaded rod 56, having a predetermined axial length, is adapted to be disposed or inserted through the throughbores 54 of each service block 28 of each segment or modular unit 10. In order to properly axially align the adjacent segments or modular units 10 with respect to each other, a pair of dowel pins 58 are provided within, for example, each right side wall 52 of each service block 28 so as to be disposed within suitable apertures formed within, for example, each left side wall 52 of each service block 28. When the plurality of segments or modular units 10 are aligned and disposed adjacent to each other in abutting relationship, then suitable washer and nut fastener components 60 may be threadedly secured upon the opposite ends of the threaded rod 56 whereby the plurality of segments or modular units 10 are now fixedly locked together.

Thus, it may be seen that in accordance with the principles and teachings of the present invention, there has been provided a new and improved fluid dispensing head assembly which comprises a fluid dispensing head assembly segment or modular unit which is adapted to be secured together with additional segments or modular units whereby resulting fluid dispensing head assemblies of predetermined sizes are able to be achieved in order to meet or satisfy customer dispensing or deposition application requirements. More particularly, each fluid dispensing head assembly segment or modular unit is fabricated so as to accommodate, house, or mount a predetermined number of dispensing valve components, such as, for example, six, eight, or ten dispensing valves. Accordingly, should a particular customer require a fluid dispensing head assembly which requires, for example, the incorporation therein of twelve, fourteen, sixteen, eighteen, twenty, or even a higher number of fluid dispensing valves to be incorporated therein, a plurality of the fluid dispensing head assembly segments or modular units can be secured together such that the resulting assemblage contains the desired or required number of fluid dispensing valves.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A hot melt adhesive material dispensing head assembly modular unit for connection to at least one other similar hot melt adhesive material dispensing head assembly modular unit so as to form an assemblage of hot melt adhesive material dispensing head assembly modular units, comprising:

a base member;

a service block mounted upon said base member for conveying therethrough hot melt adhesive material to be dispensed, said service block comprising a front wall and a pair of oppositely disposed side walls;

a predetermined number of dispensing valves mounted upon said front wall of said service block for receiving and dispensing the hot melt adhesive material conveyed through said service block; and means mounted upon said service block for enabling one of said oppositely disposed side walls of said service block to be fixedly connected to a side wall of a similar service block of another modular unit such that a plurality of modular units can be fixedly connected together whereby an assemblage of modular units comprising a multiple number of a predetermined number of dispensing valves is created.

2. The modular unit as set forth in claim 1, wherein:

said predetermined number of dispensing valves comprises six dispensing valves.

3. The modular unit as set forth in claim 1, wherein:

said predetermined number of dispensing valves is selected from a group comprising six, eight, and ten dispensing valves.

4. The modular unit as set forth in claim 1, wherein said means mounted upon said service block for enabling said service block to be fixedly connected to a similar service block of another modular unit comprises:

a throughbore formed within said service block so as to extend from a first one of said pair of oppositely disposed side walls to a second one of said pair of oppositely disposed side walls; and a threaded rod disposed through said throughbore of said service block for extension through a similar throughbore formed within a service block of a similar modular unit whereby adjacent modular units can be connected together.

5. The modular unit as set forth in claim 1, further comprising:

dowel pins provided upon at least one of said pair of oppositely disposed side walls of said service block for insertion within apertures provided within a side wall of a similar service block of another modular unit such that a plurality of modular units can be aligned with respect to each other in a side-by-side array.

6. The modular unit as set forth in claim 1, wherein:

said base member comprises an air heater block.

7. The modular unit as set forth in claim 6, wherein:

a plurality of heater coils are disposed within said air heater block for heating incoming air for operative association with the material being dispensed.

8. An assemblage of first and second hot melt adhesive material dispensing head assembly modular units, comprising:

a first base member;

a first service block mounted upon said first base member for conveying therethrough hot melt adhesive material to be dispensed, said first service block comprising a front wall and a pair of oppositely disposed side walls;

a first predetermined number of dispensing valves mounted upon said front wall of said first service block for receiving and dispensing the hot melt adhesive material conveyed through said first service block;

a second base member;

a second service block mounted upon said first base member for conveying therethrough hot melt adhesive material to be dispensed, said second service block comprising a front wall and a pair of oppositely disposed side walls;

a second predetermined number of dispensing valves mounted upon said front wall of said second service block for receiving and dispensing the hot melt adhesive material conveyed through said second service block; and means mounted upon said first and sceond service blocks for enabling one of said oppositely disposed side walls of said first service block to be fixedly connected to one of said oppositely disposed side walls of said second service block such that said assemblage of modular units comprising a multiple number of a predetermined number of dispensing valves is created.

9. The assemblage of modular units as set forth in claim 8, wherein:

said first predetermined number of dispensing valves comprises six dispensing valves; and said second predetermined number of dispensing valves comprises six dispensing valves.

10. The assemblage of modular units as set forth in claim 8, wherein:

said first predetermined number of dispensing valves is selected from a group comprising six, eight, and ten dispensing valves; and said second predetermined number of dispensing valves is selected from a group comprising six, eight, and ten dispensing valves.

11. The assemblage of modular units as set forth in claim 8, wherein said means mounted upon said first and second service blocks for enabling said first and second service blocks to be fixedly connected together, comprises:

a throughbore formed within each one of said first and second service blocks as to extend from a first one of said pair of oppositely disposed side walls of said first service block to a second one of said oppositely disposed side walls of said second service block; and a threaded rod disposed within said throughbores formed within said first and second service blocks for extension through said throughbores formed within said first and second service blocks whereby adjacent modular units can be connected together.

12. The assemblage of modular units as set forth in claim 11, further comprising:

nut members threadedly secured upon opposite ends of said threaded rod for fixedly connecting said first and second service blocks of said first and second modular units together.

13. The assemblage of modular units as set forth in claim 8, further comprising:

dowel pins provided upon at least one of said pair of oppositely disposed side walls of said first service block for insertion within apertures provided within one of said pair of oppositely disposed side walls of said second service block such that said plurality of modular units can be aligned with respect to each other in a side-by-side array.

14. The assemblage of modular units as set forth in claim 8, wherein:

said first and second base members each comprise an air heater block.

15. The assemblage of modular units as set forth in claim 14, wherein:

a plurality of heater coils are disposed within each one of said air heater blocks for heating incoming air for operative association with the material being dispensed.

\* \* \* \* \*